United States Patent [19]
Hollevoet

[11] Patent Number: 5,273,488
[45] Date of Patent: Dec. 28, 1993

[54] STONE TRAP AGITATOR FOR A COMBINE HARVESTER

[75] Inventor: Willy C. Hollevoet, Torhout, Belgium

[73] Assignee: Ford New Holland, Inc., New Holland, Pa.

[21] Appl. No.: 937,809

[22] Filed: Aug. 28, 1992

[30] Foreign Application Priority Data

Aug. 30, 1991 [GB] United Kingdom ............... 91186239

[51] Int. Cl.⁵ .............................................. A01F 12/00
[52] U.S. Cl. ..................................... 460/106; 460/119
[58] Field of Search ........................ 460/105, 106, 119

[56] References Cited

U.S. PATENT DOCUMENTS

| | | |
|---|---|---|
| 3,433,230 | 3/1969 | Larsen . |
| 4,146,038 | 3/1979 | De Busscher et al. ............. 460/105 |
| 4,335,562 | 6/1982 | Meyers et al. ........................ 460/105 |
| 4,446,875 | 5/1984 | Deleu . |
| 4,538,625 | 9/1985 | Fortune et al. ...................... 460/105 |
| 5,019,014 | 5/1991 | Hirsch et al. ........................ 460/106 |

FOREIGN PATENT DOCUMENTS

| | | |
|---|---|---|
| 0385146 | 9/1990 | European Pat. Off. . |
| 2600833 | 7/1976 | Fed. Rep. of Germany . |
| 1295199 | 11/1972 | United Kingdom . |

*Primary Examiner*—Terry Lee Melius
*Attorney, Agent, or Firm*—Frank A. Seemar; Larry W. Miller

[57] ABSTRACT

A combine harvester stone trap having its upwardly facing inlet generally in the proximity of the transition between the discharge end of the crop elevator and the forward end of the combine threshing concave. The stone trap includes a front wall in the form of a door which can be opened into a retracted position for emptying the stone trap and a rear wall which, in an operative position, effectively closes the gap between the forward end of the threshing concave and the forward end of the combine grain pan located below the concave in a conventional manner. The rear wall is movable into an inoperative position providing access to the gap between the forward ends of the threshing concave and the grain pan, and includes agitator means operatively associated therewith.

4 Claims, 5 Drawing Sheets

STONE TRAP AGITATOR FOR A COMBINE HARVESTER

FIELD OF THE INVENTION

The present invention relates generally to crop harvesting machines, commonly referred to as combine harvesters, and, more particularly to so-called stone traps fitted thereon for collecting stones and other hard foreign objects which may be entrained in the crop material fed to the threshing mechanism.

BACKGROUND OF THE INVENTION

When harvesting windrowed crops with a pick-up attachment mounted on the header of a combine harvester or when cutting the crops close to the ground surface with a direct-cut attachment, stones and other hard foreign objects inadvertently may be picked up and fed to the threshing mechanism, which thereby is exposed to severe damage. To prevent these foreign objects from entering the threshing mechanism, combine harvesters commonly are equipped with a trough-shaped stone trap disposed between the threshing mechanism and the normal crop elevator which conveys crop material from the crop gathering attachment to this threshing mechanism. Foreign objects which are fed towards the threshing mechanism are hit by threshing bars thereof and, as a result, are projected into the stone trap.

The crop elevator commonly is in the form of a feeder housing enclosing a chain-and-slat apron conveyor which entrains crop material and feeds the same rearwardly through a discharge opening of the feeder housing proximate to the threshing mechanism. The stone trap thus is positioned with its inlet opening generally at the transition between said discharge opening and the threshing mechanism with the stone trap itself being positioned below the plane of that transition. In other words, as seen from the front of the combine, the stone trap is positioned below the rearward end of the feeder housing.

Details of a combine harvester equipped with a conventional stone trap can be taken from EP-A-0.096.923, the content of which is included herein by reference.

A common problem which is occasionally experienced with conventional stone traps is the failure of foreign objects, such as stones, to automatically drop out of the stone trap upon the opening of the discharge door thereof. The reason therefore may be the machine vibrations which cause the loose material in the stone trap to become densely compacted and stick together thereby preventing this material, inclusive the foreign objects therein, to fall out of the stone trap by gravity when the stone trap door is opened. Operation in wet crop conditions may have the same effect to the extent that, in these conditions, dirt and crop particles in the stone trap may form a muddy, sticky mass which equally fails to fall from the stone trap under influence of gravity when the stone trap door is moved to its dumping or discharge position.

The stone trap door conventionally may be opened from the side of the combine harvester by means of any appropriate control means often including overcenter latching means. If the content of the stone trap fails to fall to the ground under gravity upon the opening of the stone trap door, the operator has to crawl underneath the crop elevator and to remove the stubborn content of the stone trap manually. However, as the stone trap, by its nature, is filled not only with foreign objects such as stones, but also with chaff, short pieces of straw and lots of dust, especially when harvesting crops in dry conditions, it readily will be appreciated that there is operator reluctance to remove the foreign objects manually from this awkward position underneath the feeder housing, knowing that, by doing this, a dusty and unhealthy atmosphere is created around the operator.

The need for crawling underneath the feeder housing for manually correcting a failed automatic emptying of this stone trap, has been obviated by the present invention.

SUMMARY OF THE INVENTION

According to this aspect, a combine harvester is provided which comprises a stone trap having a door which is movable between an operative position for trapping foreign objects in the stone trap and a discharge position for dumping the content of the stone trap and which is characterized in that agitator means are coupled to this door and extend into the stone trap when said door is in said operative position and are displaced through said stone trap when the door is moved from its operative to its discharge position and vice versa to thereby assist in the discharge of the stone trap content.

The agitator means may be in the form of a tube, an angle iron or other member which extends across at least a major portion of the stone trap and is hinged via a pair of arms at its opposite ends to mounting lugs on the inner face of the stone trap door.

Preferably the rear wall of the stone trap is inclined and extends upwardly and rearwardly away from the lower edge of the stone trap at which location the stone trap door is pivotally mounted. In this arrangement, the agitator means are disposed to rest on the inclined rear wall generally in the vicinity of the upper edge thereof when the stone trap discharge door is in its operative, closed position and to slide downwardly along the surface of said rear wall when the door is moved to its discharge position. This downward movement of the agitator means alongside the stone trap rear wall urges the content of the stone trap to exit. Should this not be sufficient to empty the stone trap, then the operator may open and close the stone trap door repeatedly whereby the agitator means will ride up and down the stone trap rear wall. This movement of the agitator means back-and-forth along the surface of the rear wall of the stone trap loosens the material accumulated within the stone trap whereby this material ultimately is caused to fall downwardly to the ground by gravity and this thus obviates the need for the operator to manually assist in the dumping of foreign material from the stone trap.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

In the following description, terms such as "forward", "rearward", "left", "right", etc . . . are used, which are words of convenience and which are not to be construed as limiting terms.

Figure 1:
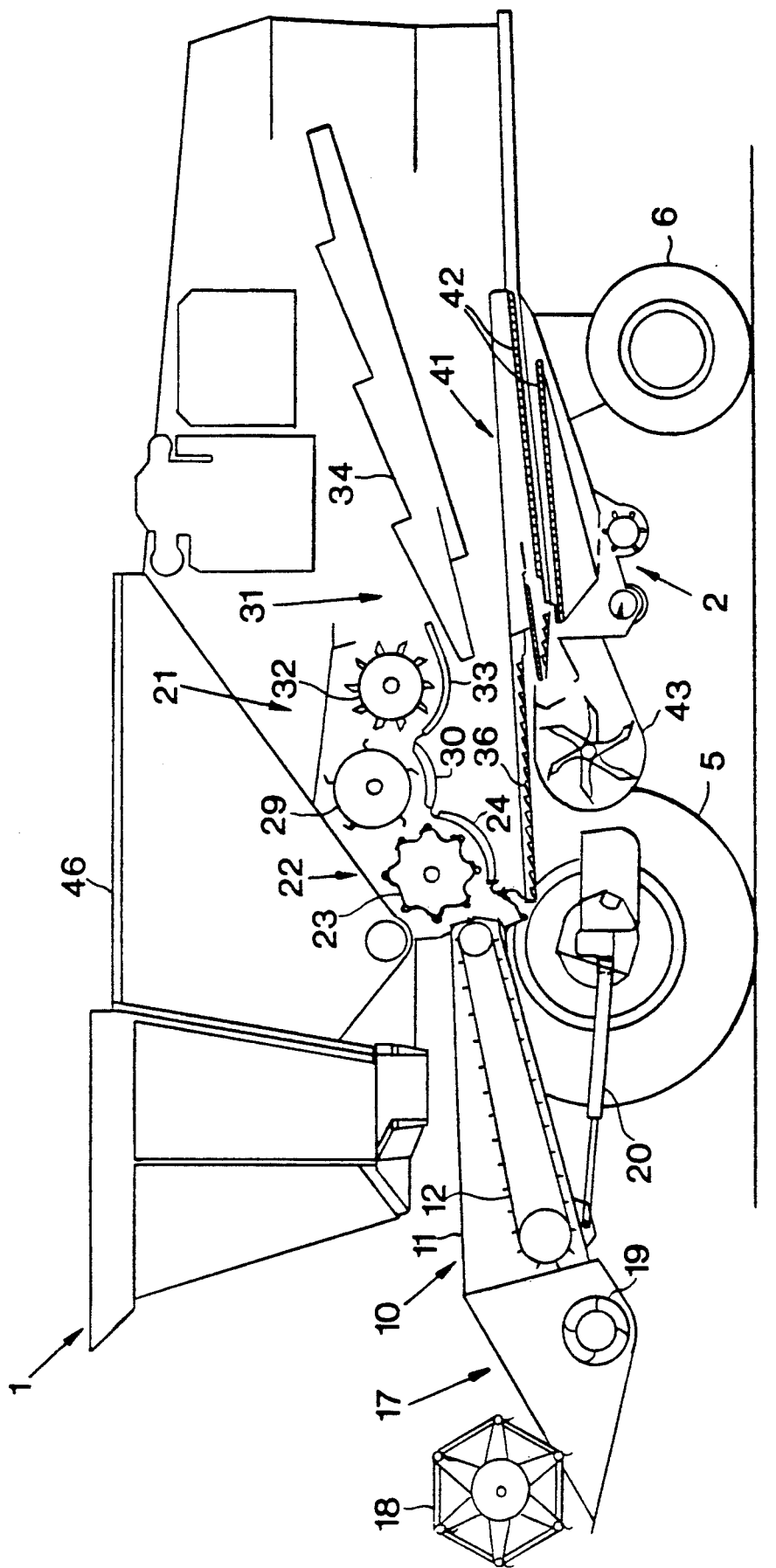
FIG. 1 is a schematic fore-and-aft sectional view of a combine harvester incorporating the present invention.

Referring now to the drawings and particularly to FIG. 1, a crop harvesting machine 1, commonly referred to as a self-propelled combine harvester, can be seen.

The combine base unit 2 comprises a wheeled frame or housing 3 supported on a front pair of traction wheels 5 and a rear pair of steerable wheels 6 for movement over a field to harvest crop material. Pivotally mounted to the front of the base unit 2 is a crop elevator 10 including a feeder house 11 at the front end of which is mounted a crop harvesting header 17 of conventional design.

In general, the header 17 includes a forwardly disposed reciprocating cutter bar (not shown) for severing crop material from the stubble. A reel 18 is disposed above and forwardly of the cutter bar to sweep crop material thereover and transport it rearwardly to a consolidating auger 19 where it is converged centrally of the machine and then elevated to threshing and separating means 21 by an elevator 12 of conventional construction in the feeder house 11. Basically, the threshing part 22 of the threshing and separating means 21 consists of a threshing cylinder 23 and a straw beater 29, each provided with respective cooperating concave means 24 and 30. The separating part 31 of said threshing and separating means 21 comprises a separator drum 32 together with an associated separator concave 33 as well as a set of longitudinally extending straw walkers 34.

Most of the grain is separated from the straw by the threshing cylinder 23 and associated concave means 24. Crop material issuing from between the threshing cylinder 23 and concave 24 is subjected to the action of the straw beater 29 and passes therefrom to the separator drum 32 and associated concave 33 and thence to the straw walkers 34, all of which effect further separation of grain from the remainder of the crop material.

Wanted grain together with chaff material, which is separated through the concave means 24, 30 and 33, falls onto a grain pan 36 and is transported towards a cleaning apparatus 41 comprising sieve assembly 42 and a cleaning fan 43. Wanted grain together with chaff material, which is separated in the straw walkers 34, falls directly onto the cleaning apparatus 41. The grain pan 36 and the sieve assembly 42 are oscillated generally back-and-forth for moving the threshed and separated material therealong while permitting the passage of cleaned grain by gravity through the sieves 42. The material on the sieve assembly 42 is subjected to a cleaning action by the fan 43 which serves to blow air through the sieve assembly 42 in order to remove the chaff and other impurities, such as dust, from the grain by making this discardable material airborne for discharge from the machine. Clean grain is collected underneath the sieve assembly 42 from where it subsequently is transferred to a grain tank 46 on top of the combine base unit 2.

Figure 2:
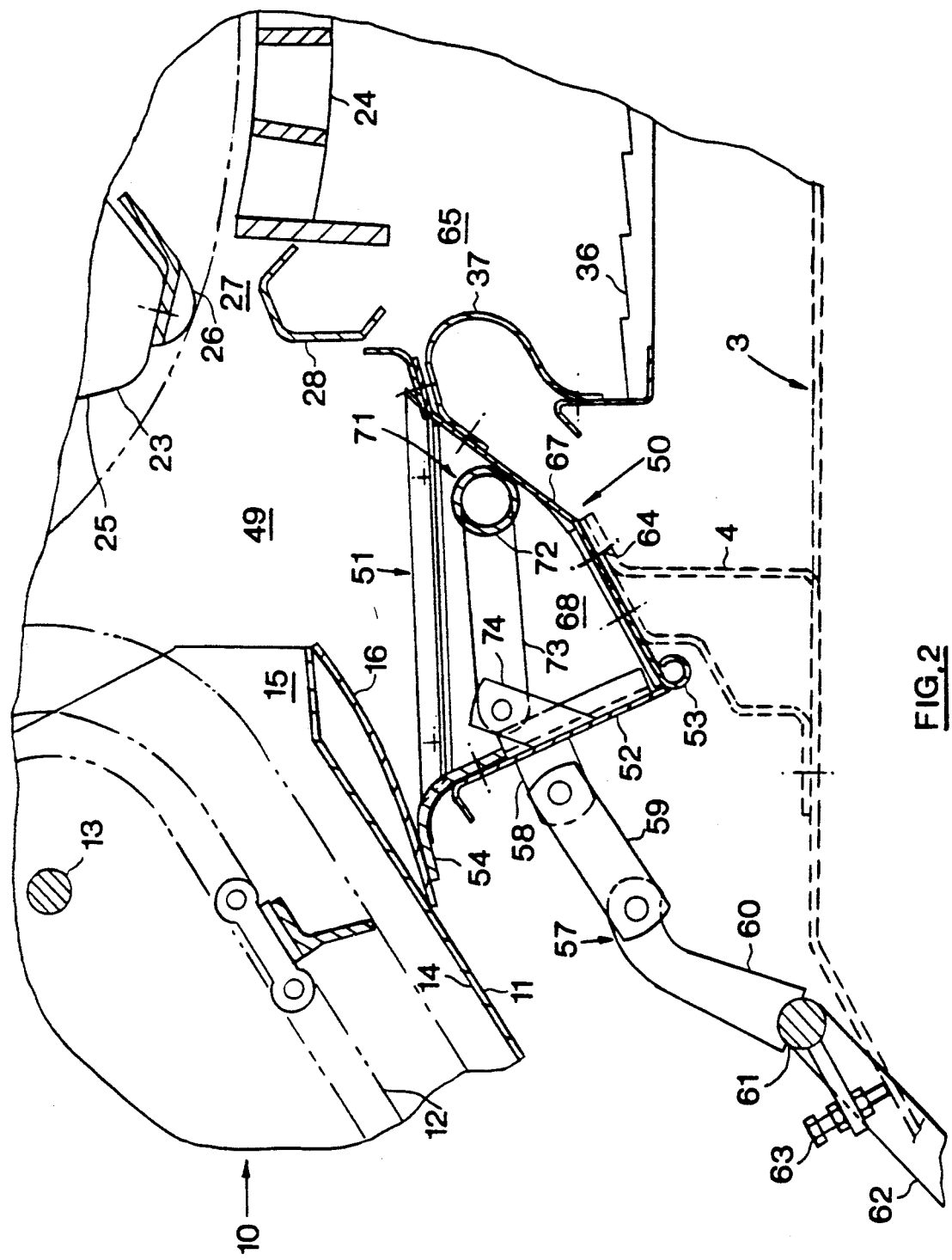
FIG. 2 is a fore-and-aft sectional view of the transitional area between the elevator housing and the threshing mechanism and including the stone trap in which the agitator is incorporated; the stone trap being shown in its closed, foreign objects trapping position.
Figure 3:
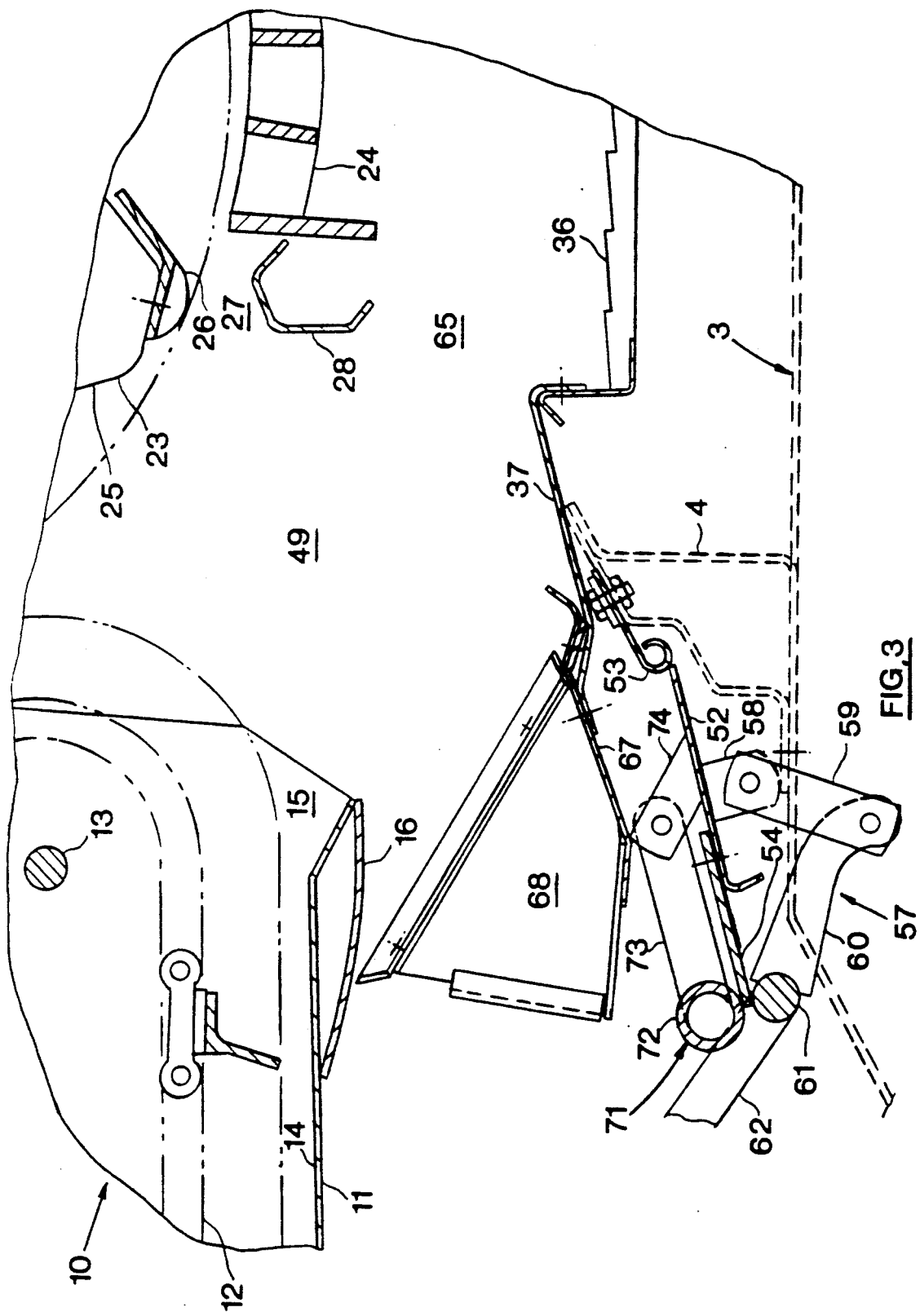
FIG. 3 is a view similar to FIG. 2 but showing the stone trap parts in positions permitting access to the grain pan from underneath the crop elevator.

With reference to FIGS. 2 and 3, the configuration of the crop elevator 10 and the threshing means 22 will now be described in further details. Typically, the elevator 12 in the feeder house 11 is in the form of an endless apron conveyor comprising transverse slats and is driven by a drive shaft 13 positioned adjacent the rearward (upper discharge) end of the feeder house 11; the sense of rotation being so that the conveyor 12 operates in an undershot manner, i.e. crop material engaged thereby is conveyed upwardly between the underside of the apron conveyor 12 and a bottom plate 14 of the feeder house 11. The orientation of the feeder house 11 relative to the combine base unit 2 and hence, also the height of the header 17 relative to the ground, is controlled by a pair of hydraulic lift cylinders 20 interconnecting the feeder house 11 and the base unit 2.

The threshing means 22 are provided rearwardly of the elevator housing discharge end 15 and the threshing cylinder 23 thereof comprises flanges 25 upon which rasp bars 26 are mounted.

Viewing now the transition area 49 between the crop elevator 10 and the threshing means 22, a stone trap 50 in accordance with the present invention is provided with its inlet 51 generally beneath this area 49 to collect and store stones and other hard, foreign objects which accidentally are picked up by the header 17 and fed rearwardly in the direction toward the threshing and separating mechanism 21. During operation, the layer of crop material passes directly from the crop elevator discharge end 15 through the transition area 49 to the intake nip 27 between the threshing cylinder 23 and the associated concave 24 and thus bridges over the stone trap inlet 51. Any hard, foreign objects in excess of a minimum size in the crop layer are hit by any one of the rasp bars 26 of the threshing cylinder 23 as they tend to enter said nip 27 and are deflected thereby into the stone trap 50 where they are collected for later discharge as is conventional.

Still with reference to FIGS. 2 and 3, the construction and operation of a first embodiment of the stone trap 50 according to the present invention will now be described in more detail. This stone trap 50 is generally triangular in cross section with the sides thereof being formed by respectively a fixed wall 67 attached to a transverse beam 4 of the machine framework 3 and extending upwardly and reaching into the immediate vicinity of the threshing concave intake profile 28 thus effectively closing the gap 65 between the forward ends of respectively the threshing concave 24 and the grain pan 36, a front door 52 hingeably connected at its lower edge to a hinge 53 attached to said transverse beam 4 adjacent the corresponding lower edge of the rear wall 67 and the upwardly facing inlet 51 disposed generally beneath the aforementioned transition area 49. The stone trap 50 further also comprises transversely opposite, generally fore-and-aft extending end walls 68 which are fixedly connected to the rear wall 67.

The stone trap door 52 is provided at its upper edge with a conventional, flexible seal 54 which is disposed to sealingly engage with a curved surface portion 16 of the elevator bottom wall 14 adjacent the elevator discharge end 15. Unlike in conventional combine harvesters, the center of curvature of this surface portion 16 is situated in front of the pivotal mounting of the crop elevator 10 on the combine base unit 2 (coaxially with the shaft 13) and preferably, the radius of curvature is substantially larger than the distance from the elevator pivot axis to said curved surface 16.

The stone trap front wall or door 52 can be opened and closed by means of an overcenter mechanism 57 comprising a handle 62 which extends to one side of the crop elevator 10 and which is connected to a transverse pivot shaft 61 to which also is connected an arm 60 which itself is pivotally connected via a link 59 to a lug 58 attached to the stone trap door 52. For closing the stone trap door 52, the handle 62 is lowered to the position shown in FIG. 2 thus moving the mechanism 57 overcenter until a stop 63 on the pivot shaft 61 becomes operational. For opening the stone trap door 52, the handle 62 is pivoted upwardly whereby the mechanism 57 goes overcenter in the opposite direction and the door 52 is pivoted into the position shown in FIG. 3.

Agitator means 71 are connected to the stone trap door 52 and comprise a tube, angle iron or other member 72 which extends across at least a major portion of the transverse width of the stone trap 50 when the door 52 is in its closing position. Said agitator member 72 is hinged at its opposite ends via a pair of arms 73 to mounting lugs 74 provided on the inner face of the stone trap door 52 and, when said door 52 is in its closing position, said member 72 is supported on the stone trap rear wall 67 generally adjacent the upper edge thereof.

As to this stone trap rear wall 67, it should be noted that, on the one hand, it is detachably mounted on the transverse beam 4 of the combine framework 3 via the intermediary of quickly releasable fasteners 64 and, on the other hand, a flexible seal 37 extends between this wall 67 and the leading edge of the grain pan 36 in a manner so as to avoid interference with the oscillatory movement of the latter during normal operation.

During this normal operation, the various components are placed in the positions as shown in FIG. 2 and the elevator may be pivoted as is required by the normal harvesting operation without any leakage occurring between the sealing 54 and the associated curved surface 16 of the elevator bottom wall 14.

The operator may empty the stone trap 50 from the side of the elevator 10, i.e. without having to crawl underneath this elevator 10, by opening the door 52 thereof by means of the overcenter mechanism 57. As the door 52 is being opened, the agitator member 72 is caused to move downwardly along the stone trap rear wall 67 to thereby assist in discharging the stone trap content. However, should this action fail to empty the stone trap 50 completely at once, then, the operator may repeatedly open and close the stone trap front wall 52 to thereby move the agitator member 72 back-and-forth through the stone trap 50 so as to ultimately remove the entire content thereof.

Access to the area between the threshing concave 24 and the grain pan 36 therebelow is possible from underneath the elevator 10 after the stone trap door 52 has been opened, the agitator means 71 have been brought into the position shown in FIG. 3 and the stone trap rear wall 67 has been detached from the frame member 4 and turned and displaced forwardly as far as permitted by the flexible seal 37. This front access greatly facilitates the servicing of the aforementioned area, such as cleaning of the grain pan 36 and/or the threshing concave 24. This access may be even further improved by disconnecting the crop elevator 10 from the base unit 2 and such further improved access may be desirable when there is a need for a major servicing of, e.g., the threshing mechanism. However, the elevator normally does not need to be disconnected when cleaning of the grain pan 36 is required.

Figure 4:
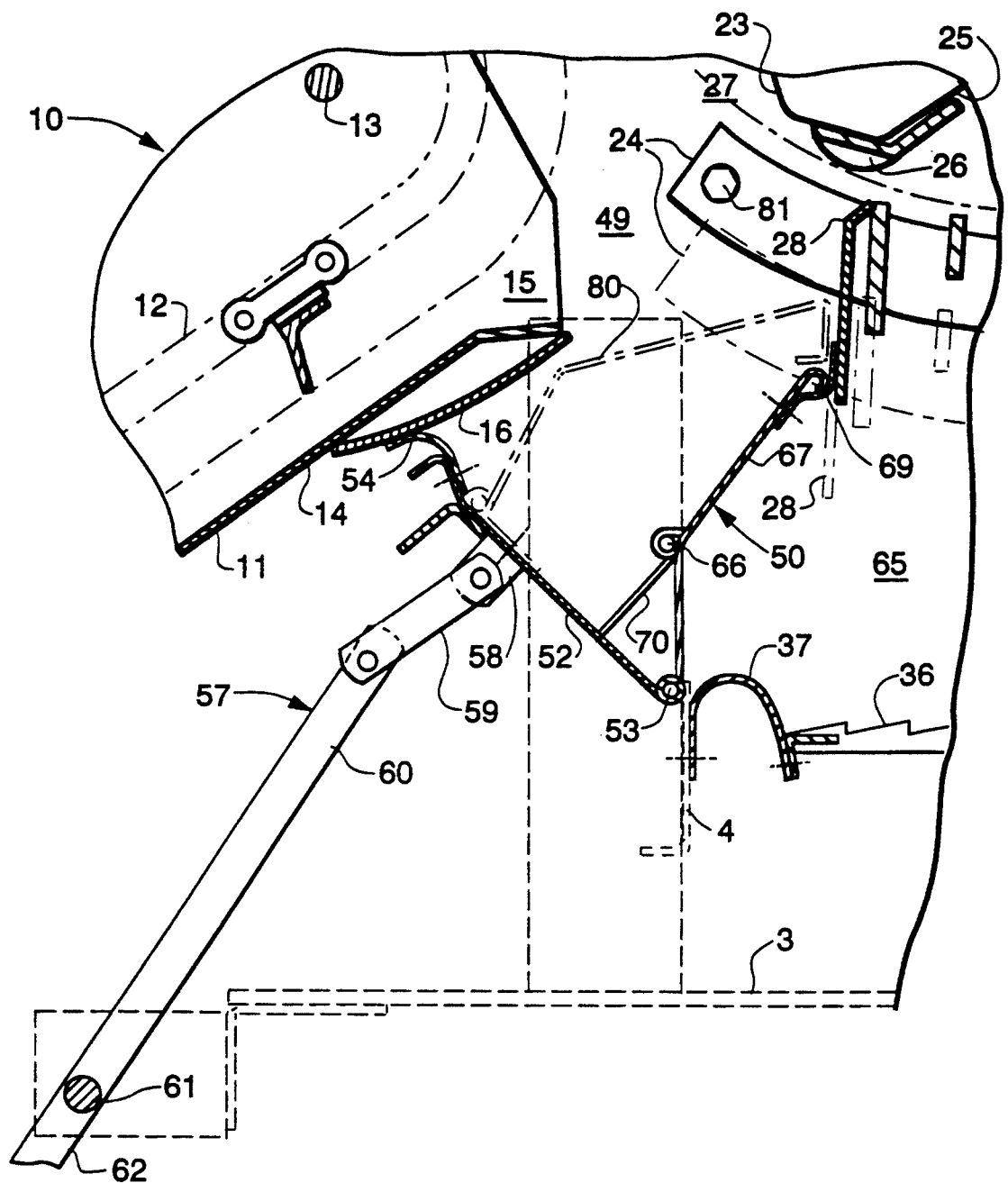
FIGS. 4 and 5 are views similar to FIGS. 2 and 3, respectively, but showing an alternative embodiment of the stone trap.
Figure 5:
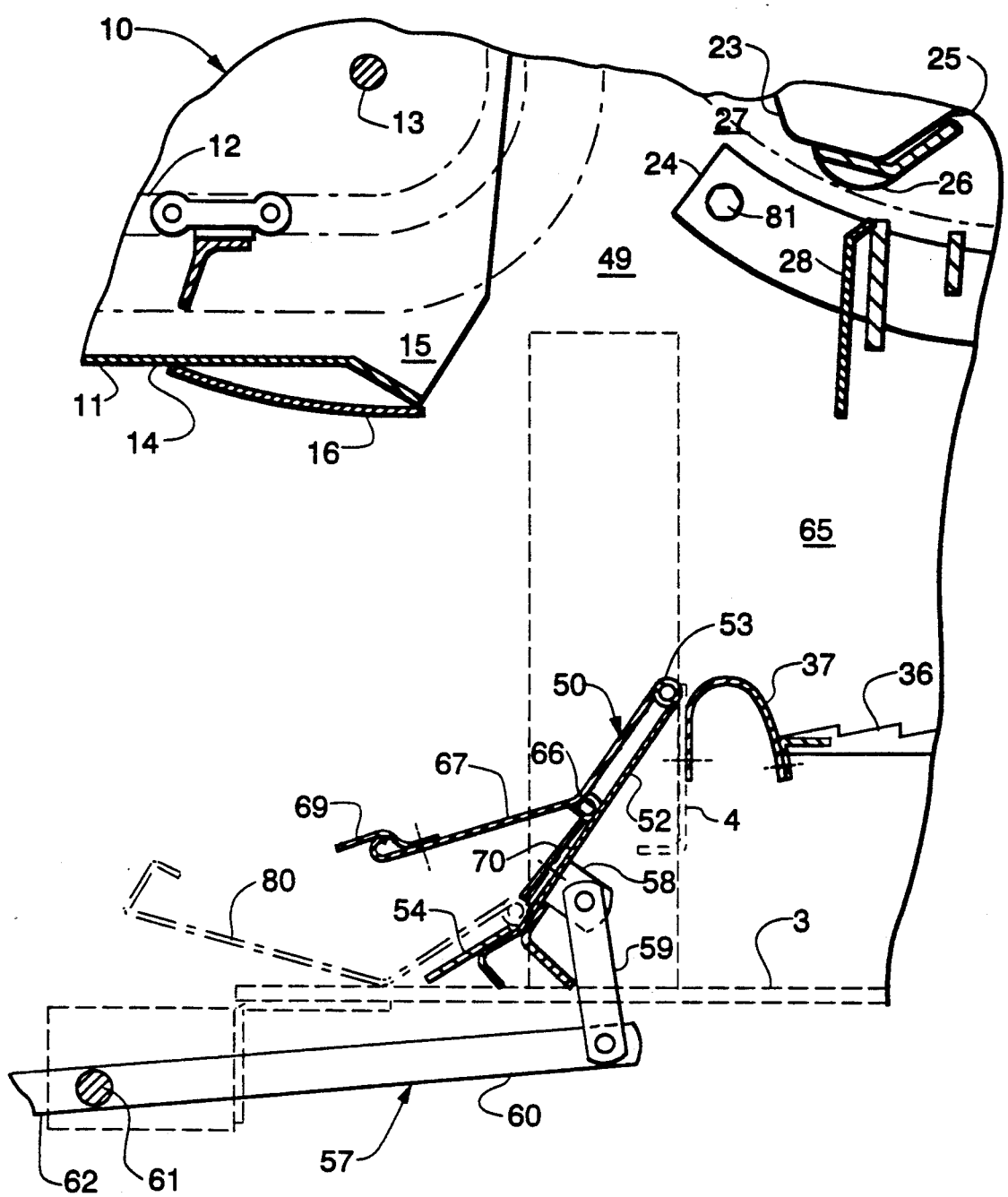

With reference to FIGS. 4 and 5, an alternative embodiment of the stone trap is shown. With respect to this embodiment, the same reference numbers are used for indicating those components which are either identical or similar to the corresponding components of the arrangement according to FIGS. 2 and 3.

As can be seen in the drawings, the stone trap rear wall 67 of this embodiment is pivotally mounted on the frame member 4 rather than being detachably connected thereto as is the case in the first embodiment. A flexible seal 69 may be provided at the upper edge of the rear wall 67 to sealingly engage with the intake profile 28 of the threshing concave 24 while still permitting adjustment of this concave 24 relative to the threshing cylinder 23 a is conventional and as is illustrated in FIG. 4 by means of showing the concave 24 in broken lines in a lowered position.

A latching pin 66 is slidably mounted on the stone trap rear wall 67 adjacent each one of its transverse edges in a manner to permit fixation of this rear wall 67 in its operative position by engaging these pins 66 with appropriate holes (not shown) in adjacent frame members. Each pin 66 may have a handle 70 connected thereto to facilitate the latching of the rear wall 67 in its operative position.

Alternatively or at the same time, each handle 70 may also be disposed so that its free end may be engaged by the stone trap door 52 when the latter is moved to its closing position and thus, in this case, handles 70 effectively also are abutment members. With this arrangement, it is not necessary to actually engage the pins 66 with the corresponding holes in the adjacent frame members (and thus these pins then may be mere pivots) in case the handles or abutment members 70 are dimensioned and positioned so that, with the stone trap door 52 in its closing position, the stone trap rear wall 67 is held thereby against appropriate abutments (not shown) on the frame in its operative position. The abutment members 70 may be provided with appropriate stops which, in combination with gravity, place these members 70, when the rear wall 67 is in its operative position, in the appropriate positions ready for engagement by the door 52 upon the closing thereof. On the other hand, when the rear wall 67 is pivoted towards its inoperative position shown in FIG. 5, the members 70 pivot by gravity to the retracted position as is illustrated.

The flexible seal 37 associated with the grain pan 36 extends between this grain pan 36 and the frame member 4 rather than the stone trap rear wall 67.

As is conventional, a stone trap filler plate 80 may be used in situations where the stone trap 50 is not needed, i.e., when there exist no risks for solid, foreign objects to be picked up together with the crop material. This is the case when harvesting rice or corn. Such a filler plate 80 is intended to prevent material from entering the stone trap 50 when harvesting said crops. In the arrangement according to FIGS. 4 and 5, such a filler plate 80 is pivotally attached to the inner face of the stone trap door 52 in the same manner as the agitator means 71 are connected to the door 52 in the arrangement according to FIGS. 2 and 3. In other words, the free end of the filler plate 80 also is caused to move downwardly along the stone trap rear wall 67 when the door 52 is opened and, furthermore, said filler plate 80 also can be swung to the retracted, inoperative position shown in FIG. 5 for improving the access to the area between the grain pan 36 and the threshing concave 24. Obviously, the filler plate 80 and the agitator means 71 need not and moreover also cannot be used at the same time.

From what precedes and as can be taken from FIG. 5, access from below the elevator 10 to the area above the forward end of the grain pan 36 is possible after the stone trap door 52, the filler plate 80, respectively the agitator means 71 and the stone trap rear wall 67 all are pivoted into their respective retracted, inoperative positions shown in FIG. 5. As in the first embodiment, such access permits, e.g., easy cleaning of the grain pan 36 and the concave 24 and, provided the concave 24 is connected at its transversely opposite forward ends to the conventional concave supporting mechanism (not shown) by couplings 81 which enable easy disassembly thereof, easy access is also provided to the threshing cylinder 23 in as much as couplings 81 can be released to permit a lowering of the forward end of the concave 24 until it rests on the grain pan 36 and so that the intake nip 27 between the threshing cylinder 23 and the associated concave 24 is opened in the direction of the area beneath the elevator 10. This access to the threshing cylinder 23 does not require the disconnection of the elevator 10 but, if the elevator 10 is nevertheless disconnected, access to the threshing cylinder 23 is even further improved.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A combine harvester including a stone trap comprising a door movable between an operative position for trapping foreign objects in the stone trap and a discharge position for dumping the content of the stone trap, the improvement comprising agitator means coupled to said door and extending into said stone trap under conditions wherein said door is in said operative position, and means for displacing said agitator means through said stone trap when said door is moved from its operative position to its discharge position and vice versa to thereby assist in the discharge of the stone trap contents.

2. A combine harvester according to claim 1, wherein said agitator means comprise an agitator member extending across at least a major portion of said stone trap, mounting means, and a pair of arms for hinging said agitator member at its opposite ends to said mounting means on the inner face of said stone trap door.

3. A combine harvester according to claim 2, wherein said stone trap includes a lower edge and an upper edge, a stone trap rear wall extending upwardly and rearwardly away from said lower edge at which location said stone trap door is pivotally mounted, and said agitator means rest on said rear wall in the vicinity of the upper edge thereof when said stone trap door is in its closed position and said agitator means movable along the inner surface of said rear wall when the stone trap door is moved to its discharge position.

4. A combine harvester according to claim 3 wherein said agitator means are moveable into an inoperative retracted position under conditions where said stone trap door is in its inoperative position.

* * * * *